United States Patent
Lin et al.

(10) Patent No.: US 11,899,527 B2
(45) Date of Patent: Feb. 13, 2024

(54) SYSTEMS AND METHODS FOR IDENTIFYING MACHINE ANOMALY ROOT CAUSE BASED ON A SELECTED REDUCED ORDER MODEL AND A SELECTED FAULT MODEL

(71) Applicant: Caterpillar Inc., Peoria, IL (US)

(72) Inventors: David J. Lin, Peoria, IL (US); Tyler P. Jewell, Timnath, CO (US); Daniel J. Organ, Peoria, IL (US); Vivek Sundararaj, Peoria, IL (US); Vijay K. Yalamanchili, Chicago, IL (US); Chanyoung Park, Savoy, IL (US); William Kent Rutan, Chillicothe, IL (US); Kaimei Sun, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 17/539,011

(22) Filed: Nov. 30, 2021

(65) Prior Publication Data
US 2023/0168961 A1 Jun. 1, 2023

(51) Int. Cl.
*G06F 11/07* (2006.01)

(52) U.S. Cl.
CPC ........ *G06F 11/079* (2013.01); *G06F 11/0736* (2013.01)

(58) Field of Classification Search
CPC .......................... G06F 11/079; G06F 11/0736
See application file for complete search history.

(56) References Cited

U.S. PATENT DOCUMENTS

| 10,732,618 | B2 | 8/2020 | Xin et al. | |
| 10,752,269 | B2* | 8/2020 | Govindappa | B61L 15/0081 |
| 11,703,246 | B2* | 7/2023 | Alanqar | G05B 13/044 |
| | | | | 700/277 |
| 11,740,157 | B1* | 8/2023 | Nguyen | G05D 7/0623 |
| | | | | 700/282 |
| 2009/0300429 | A1* | 12/2009 | McCroskey | G06F 11/0739 |
| | | | | 714/48 |

(Continued)

FOREIGN PATENT DOCUMENTS

| CN | 110454290 A | 11/2019 |
| CN | 110704213 B | 7/2020 |
| EP | 4033390 A1 * | 7/2022 |

*Primary Examiner* — Joseph O Schell

(57) ABSTRACT

A method for identifying a cause of a machine operating anomaly including creating a reduced order model (ROMs) for a digital twin model of a selected machine type and feeding current data from a deployed machine into the ROM. The method can include comparing a current output from the selected ROM with a measured output from the current data and determining that an operating anomaly exists when the difference between the current output and the measured output exceeds a selected anomaly threshold. The cause of the operating anomaly can be identified by feeding the current data into a plurality of fault models, wherein each fault model includes a particular component failure, comparing a fault model output from each of the plurality of fault models with the measured output from the current data, selecting the fault model with the fault model output most closely matching the measured output, and displaying the identified component failure associated with the selected fault model as the cause of the operating anomaly.

17 Claims, 13 Drawing Sheets

(56) References Cited

U.S. PATENT DOCUMENTS

| | | | |
|---|---|---|---|
| 2017/0102982 A1* | 4/2017 | Kolandavelu | G05B 23/0248 |
| 2017/0235857 A1* | 8/2017 | Haye | G06N 3/088 |
| | | | 703/7 |
| 2017/0286572 A1 | 10/2017 | Hershey et al. | |
| 2019/0138970 A1 | 5/2019 | Deutsh et al. | |
| 2020/0067969 A1* | 2/2020 | Abbaszadeh | G06N 20/10 |
| 2020/0218628 A1* | 7/2020 | Mathews, Jr. | B29C 64/386 |
| 2022/0129606 A1* | 4/2022 | Sundararajan | G06F 30/17 |
| 2023/0122653 A1* | 4/2023 | Yoshida | G06F 11/0706 |
| | | | 714/37 |

* cited by examiner

Anomaly Detection

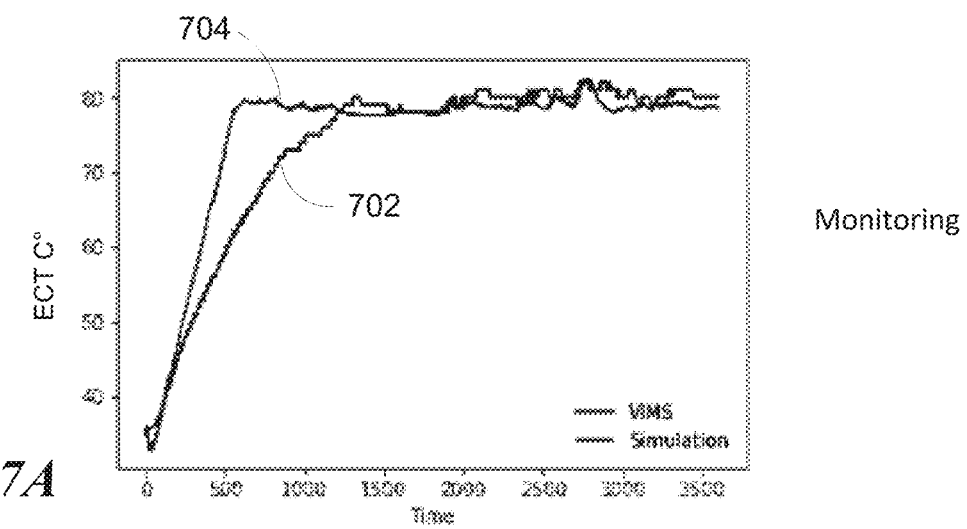
FIG. 7A — Monitoring
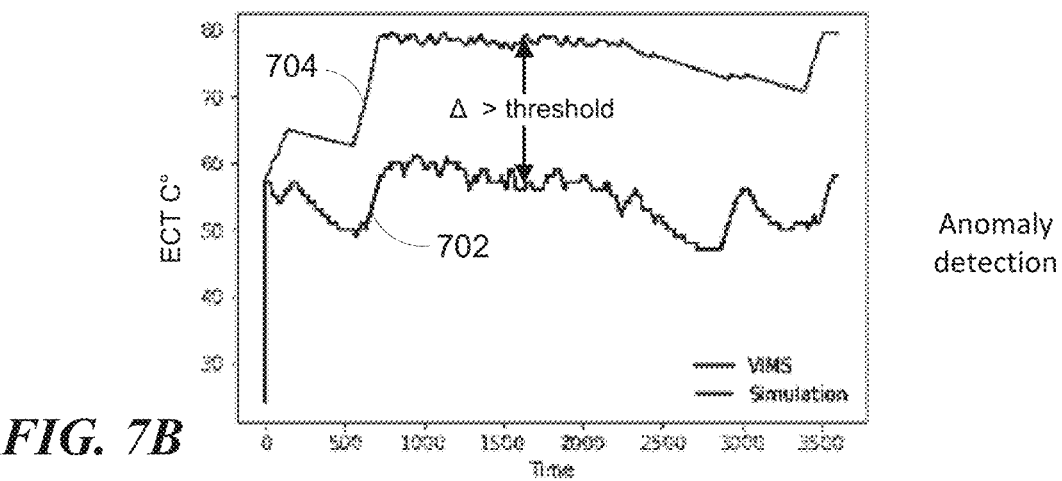
FIG. 7B — Anomaly detection
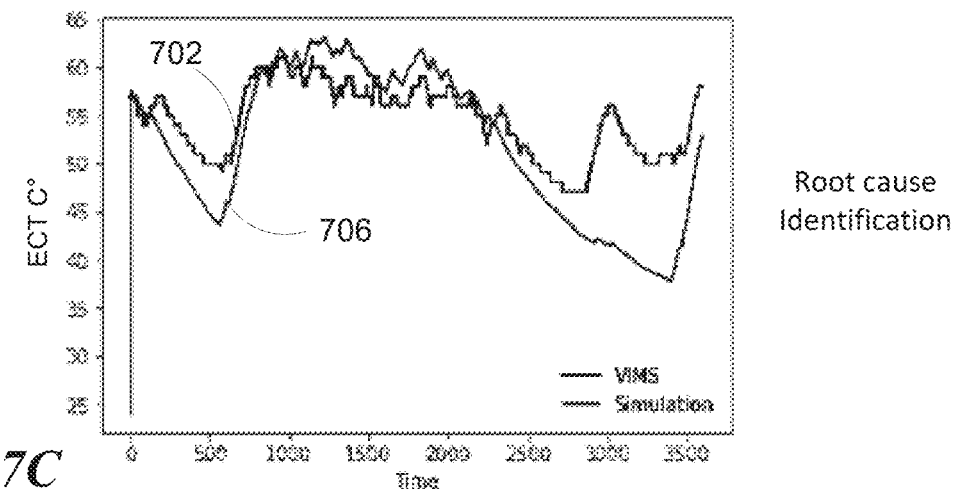
FIG. 7C — Root cause Identification

SYSTEMS AND METHODS FOR IDENTIFYING MACHINE ANOMALY ROOT CAUSE BASED ON A SELECTED REDUCED ORDER MODEL AND A SELECTED FAULT MODEL

TECHNICAL FIELD

This patent application is directed to machine condition monitoring and failure analysis, and more specifically, to identifying anomalies and causes of those anomalies.

BACKGROUND

Equipment maintenance has historically been scheduled using time-based or interval-based conditions, i.e., hours of operation, miles traveled, etc. Advances in on-board sensor technology and telematics have enabled condition-based maintenance (CBM) approaches based on the actual operating environment and load on the systems over the operating time period. Most CBM is based on simple rule-based models using telematics data combined with expert knowledge about the systems being monitored. More recently, advanced data science has been employed to develop machine learning models for predictive maintenance that identify anomalies, indicate near-term failure, and quantify remaining useful life (RUL). However, these models are highly dependent on labeled ground truth data—clear definition of failure and multiple samples to provide a clear statistical picture of the inputs that are predictive of those failures. This is necessary for each anomaly or failure mode for which a model is being developed, and in many cases is difficult to collect. Moreover, anomaly detection based on data do not typically identify the root cause of failure, but rather just identify a problem has occurred. More insight is needed to help diagnose the root cause so that proper corrective action can be taken.

U.S. Pat. No. 10,752,269 to Govindappa et al., (hereinafter "Govindappa") describes a system that includes one or more processors configured to obtain operating parameters of a subsystem of a vehicle that is configured to travel along a route during a trip. The processors are configured to generate a digital twin of the subsystem based on the operating parameters. The processors are configured to receive simulated performance data generated by execution of the digital twin with a designated model of the subsystem. The processors are further configured to obtain field performance data of the subsystem that is monitored by one or more sensors onboard the vehicle during the trip, and to determine a performance composite index of the subsystem of the vehicle based on a variance between the simulated performance data and the field performance data. The system can also be configured to determine that the performance composite index of the subsystem is outside of a satisfactory health range responsive to the variance exceeding a designated variance threshold.

While Govindappa can identify a variance between digital twin simulated performance data and field performance data, Govindappa does not identify the root cause of the variance. Furthermore, high fidelity physics based digital twin simulations can be expensive and time consuming to run at scale. Thus, there are still opportunities to improve anomaly identification and root cause analysis. The example systems and methods described herein are directed toward overcoming one or more of the deficiencies described above and/or other problems with the prior art.

SUMMARY

In some embodiments, a method for identifying a cause of a machine operating anomaly can include creating a reduced order model (ROMs) for a digital twin model of a selected machine type and feeding current data from a deployed machine into the ROM. The method can also include comparing a current output from the selected ROM with a measured output from the current data and determining that an operating anomaly exists when the difference between the current output and the measured output exceeds a selected anomaly threshold. The cause of the operating anomaly can be identified by feeding the current data into a plurality of fault models, wherein each fault model includes a particular component failure. A fault model output from each of the plurality of fault models can be compared with the measured output from the current data. The fault model with output most closely matching the measured output is selected and the component failure associated with the selected fault model is displayed and identified as the cause of the operating anomaly.

According to some aspects, each fault model can be a ROM based on a corresponding digital twin model of the machine including the particular component failure. In some aspects, creating the ROM for the digital twin model includes: creating a plurality of reduced order models for the digital twin model for the selected machine type; feeding historical data from a plurality of machines of the selected machine type into the plurality of ROMs and the digital twin model; comparing an output from the digital twin model with an output from each of the ROMs; and selecting the ROM with the output most closely matching the output of the digital twin model. In further aspects, the plurality of reduced order models can include one or more of a gradient boosting model, a regression model, a recurrent neural network model, or a long short-term memory model. According to some aspects, the method can further comprise receiving the current data from a plurality of sensors on the deployed machine. In some aspects, the method can further comprise identifying a machine subsystem associated with the operating anomaly. In some aspects, the plurality of fault models are based on a subsystem model associated with the identified machine subsystem.

In some embodiments, a system for identifying a cause of a machine operating anomaly can include one or more processors and one or more memory devices having instructions stored thereon. When executed, the instructions cause the processors to create a reduced order model (ROMs) for a digital twin model of a selected machine type. The instructions can also cause the processors to receive current data from a plurality of sensors on the deployed machine and feed the current data into the ROM. A current output from the selected ROM is compared with a measured output from the current data to determine that an operating anomaly exists when the difference between the current output and the measured output exceeds a selected anomaly threshold. The cause of the operating anomaly can be identified by feeding the current data into a plurality of fault models, wherein each fault model includes a particular component failure. A fault model output from each of the plurality of fault models can be compared with the measured output from the current data. The fault model with output most closely matching the measured output is selected and the component failure associated with the selected fault model is identified as the cause of the operating anomaly.

According to some aspects, the system can further comprise the plurality of sensors on the deployed machine. In some aspects, the current data from the plurality of sensors is received via a satellite network.

In some embodiments, one or more non-transitory computer-readable media can store computer-executable instructions that, when executed by one or more processors, cause the one or more processors to perform operations. The operations can include creating a reduced order model (ROMs) for a digital twin model of a selected machine type and feeding current data from a deployed machine into the ROM. The operations can also include comparing a current output from the selected ROM with a measured output from the current data and determining that an operating anomaly exists when the difference between the current output and the measured output exceeds a selected anomaly threshold. The cause of the operating anomaly can be identified by feeding the current data into a plurality of fault models, wherein each fault model includes a particular component failure. A fault model output from each of the plurality of fault models can be compared with the measured output from the current data. The fault model with output most closely matching the measured output is selected and the component failure associated with the selected fault model is identified as the cause of the operating anomaly.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 7A is a graph of actual and simulated machine coolant temperature for a representative nominal operating condition;

FIG. 7B is a graph of actual and simulated machine coolant temperature illustrating an operating anomaly;

FIG. 7C is a graph of actual machine coolant temperature and simulated temperature with a particular component failure;

Figure 1:
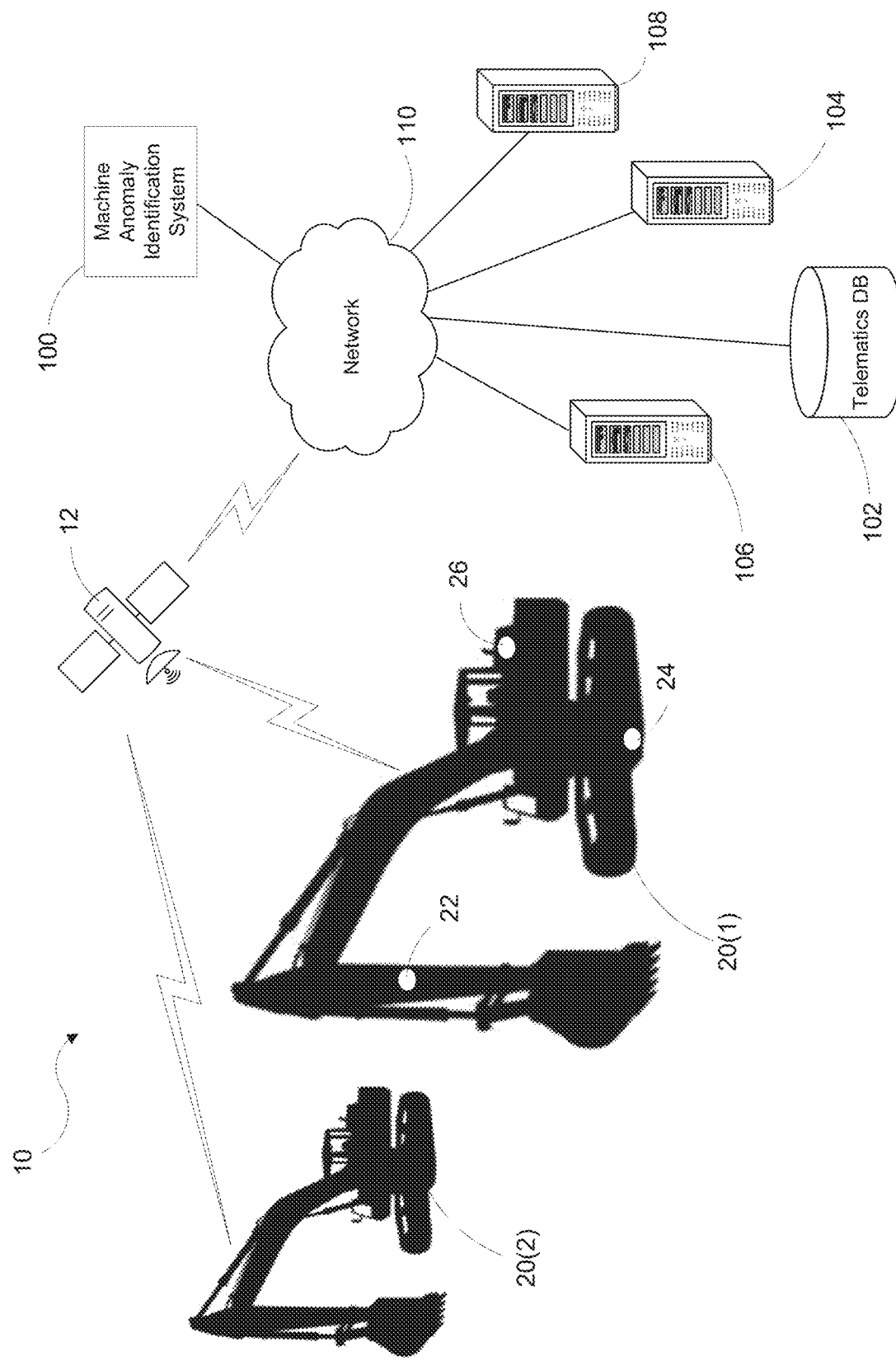
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for machine anomaly identification and cause analysis. Physics-based machine and system simulations created for product development can be leveraged to improve condition monitoring applications. A physics-based simulation model that has been calibrated to closely match the normal behavior of the physical system is defined as a digital twin of that physical system. The calibrated digital twin for normal behavior can be converted to a lower fidelity model e.g., reduced-order model (ROM) based on deep learning to improve efficiency and lower cost of the baseline comparisons. Telematics data from a system of interest is used as inputs for the digital twin based ROM. If the difference in outputs between the ROM and physical system are within a defined threshold (within e.g., 10 percent of the ROM), monitoring of the system continues. Otherwise, if the difference in outputs exceed (either below or above) the defined threshold, additional simulations are run using physics-based digital twins based ROMs that are seeded with various faults, i.e., models that represent failure due to different root causes. There may be several of these "seeded fault" ROMs, and they may represent various levels of each root cause failure, for instance, the size of a leak could be varied as a root cause. The outputs from the seeded fault digital twin based ROMs are compared to telematics outputs from the physical system. The system can identify the seeded fault digital twin that most closely matches the physical outputs to identify the root cause of the failure. In some implementations, a single digital twin will be capable of identifying a wide range of failures and root causes. For instance, a digital twin for an engine system will be able to identify failures and diagnose root cause for the air system, fuel system, cooling system, etc.

FIG. 1 illustrates an environment 10 in which some implementations of the machine anomaly identification and cause analysis system 100 can operate according to embodiments of the disclosed technology. The system environment 10 can include multiple machines, such as excavators 20(1) and 20(2), a satellite 12, telematics database 102, a physics-based digital twin model system 104, ROMs system 106, fault models system 108, and a network 110. The machine anomaly identification and cause analysis system 100 can be connected to the telematics database 102, the physics-based digital twin models system 104, the ROMs system 106, and the fault models system 108 via network 110. The telematics database 102 and the machine anomaly identification system 100 can receive telematics data from the excavators 20(1) and 20(2) via satellite 12. The telematics data can include sensor data from the excavators, such as from a pressure sensor 22, a vibration sensor 24, and a temperature sensor 26, to name a few.

Figure 2:
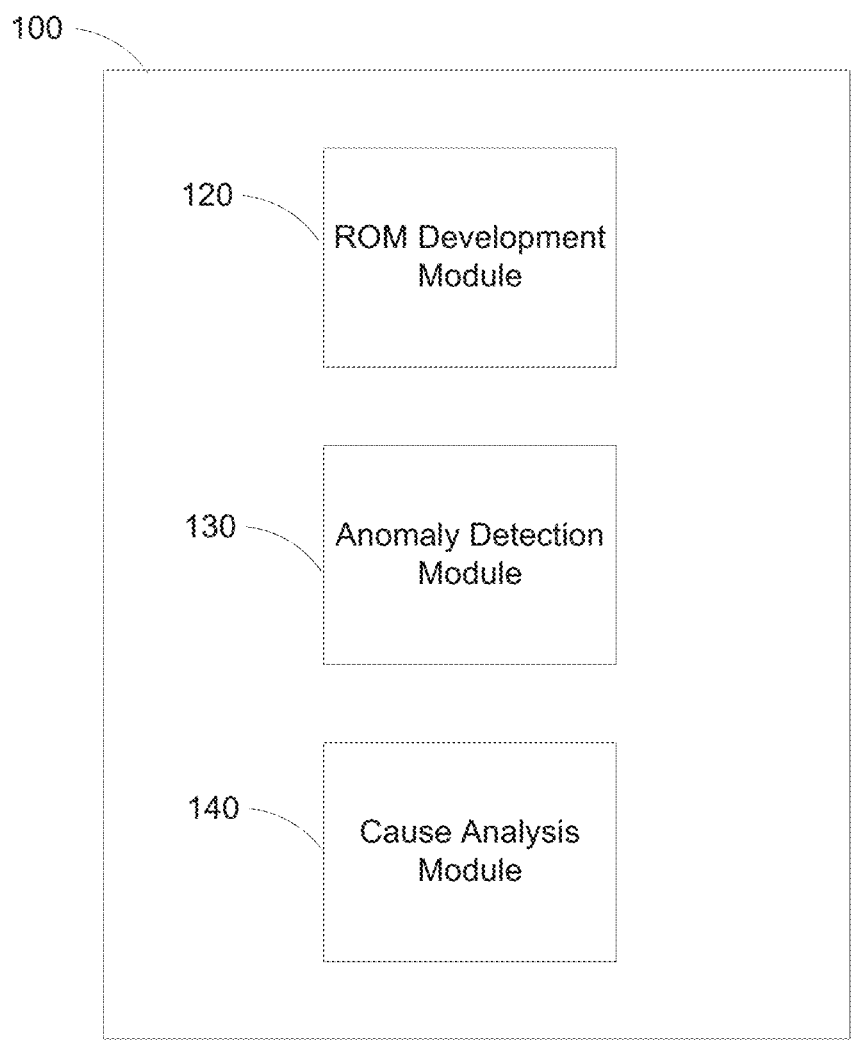
FIG. 2 is a block diagram illustrating an overview of a machine anomaly identification and cause analysis system according to some embodiments of the disclosed technology.

As shown in FIG. 2, the machine anomaly identification and cause analysis system 100 can comprise a ROM development module 120, an anomaly detection module 130, and a cause analysis module 140. In some embodiments, the ROM development module 120 is configured to convert high-fidelity models, such as physics-based digital twins (e.g., digital twin models 104), into scalable ROMs (e.g., ROMs 106). Module 120 can also statistically compare ROM and digital twin output to select the best performing ROM for each digital twin model. The ROM development module 120 can use different techniques to develop ROMs, such as gradient boosting, regression, recursive neural networks, long short-term memory models, and optimization, to name a few.

In some embodiments, the anomaly detection module 130 can be configured to feed current data received either directly from a deployed machine (e.g., excavator 20(1)) or stored in the telematics database 102 into the selected ROM. Module 130 can also compare an output from the ROM with the current data to determine that an operating anomaly exists when the difference between the current output and the measured output exceeds a selected anomaly threshold.

In some embodiments, the cause analysis module 140 can be configured to identify the cause of the operating anomaly by feeding the current data from the deployed machine into a plurality of fault models (e.g., fault models 108). Each fault model can include a particular fault, such as a component failure. Module 140 can compare a fault model output from each of the plurality of fault models with the measured output from the current data. The fault model with the output most closely matching the measured output is selected and the component failure associated with the selected fault model is identified as being the cause of the operating anomaly.

Figure 3:
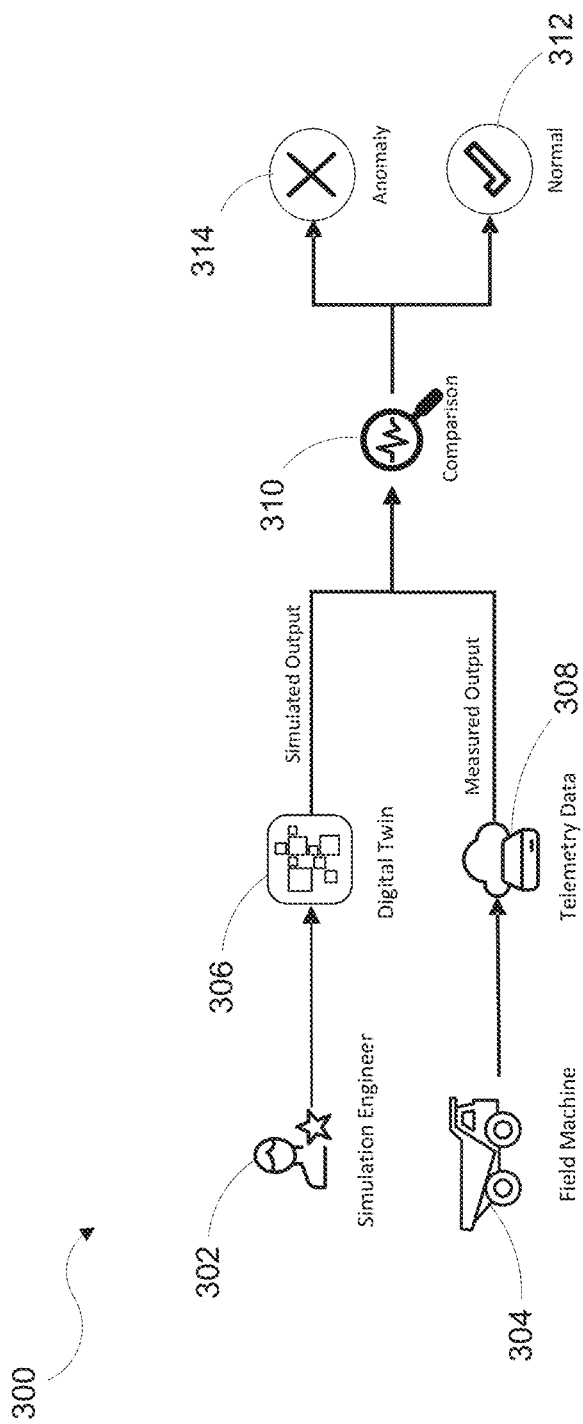
FIG. 3 is a diagram illustrating a digital twin anomaly detection system according to embodiments of the disclosed technology.

FIG. 3 illustrates a digital twin anomaly detection system 300 according to embodiments of the disclosed technology. In the anomaly detection system 300 a simulation engineer can calibrate a physics-based simulation model (i.e., a digital twin 306) to closely match the normal behavior of a physical system. Telematics data 308 from a system of interest (e.g., machine 304) is used as inputs for the digital twin 306. If the difference (e.g., comparison 310) in outputs between the digital twin and the physical system are less than a defined threshold, the system is operating normally 312 and monitoring of the system can continue. Otherwise, if the difference in outputs exceeds (either below or above) the defined threshold, an anomaly 314 is identified. High-fidelity physics-based digital twins can be expensive and time consuming to run at scale. Furthermore, the anomaly detection system 300 does not identify the root cause of failure, but rather just identifies that a problem has occurred. The embodiments described below with respect to e.g., FIGS. 4-6 improve upon the digital twin anomaly detection system 300 by converting the digital twin to a ROM and analyzing the anomaly to determine its cause.

Figure 4:
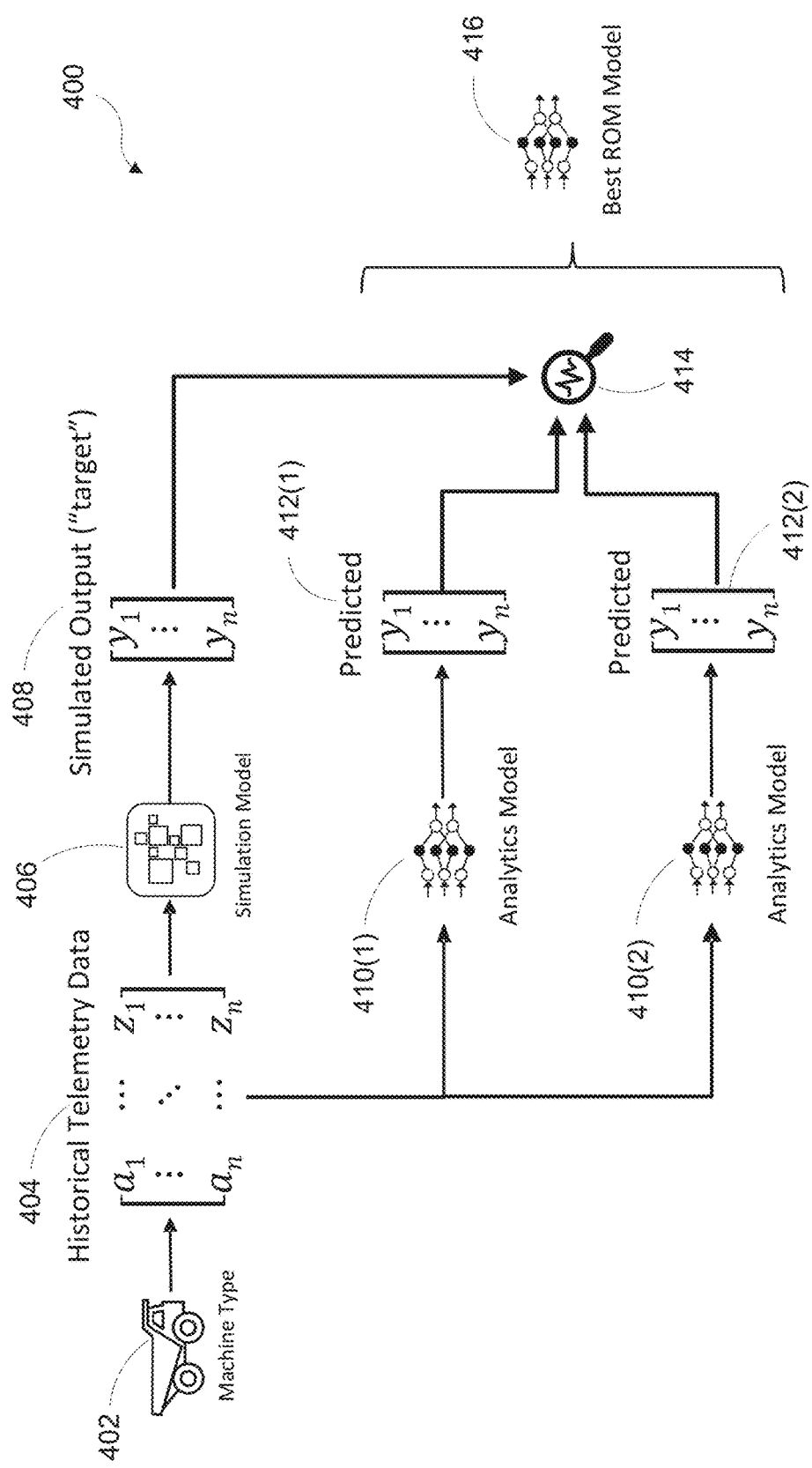
FIG. 4 is a diagram illustrating a system for developing a reduced order model for detecting machine anomalies according to some embodiments of the disclosed technology.

FIG. 4 illustrates a system 400 for creating a ROM for a digital twin model of a selected machine type 402 (e.g., a dump truck) for detecting machine operating anomalies according to some embodiments of the disclosed technology. Creating the ROM for the digital twin model can include creating a plurality of candidate reduced order models 410(1) and 410(2) for the digital twin model 406 for the selected machine type 402. Historical data 404 from a plurality of machines of the selected machine type is fed into the plurality of ROMs 410 and the digital twin model 406. An output 408 from the digital twin model is compared 414 with an output 412(1) and 412(2) from each of the ROMs 410(1) and 410(2), respectively. The model outputs can be statistically compared using various suitable methods including a distance measure. The ROM with the output most closely matching the output of the digital twin model can be selected as the best ROM model 416 for use in anomaly detection. In some embodiments, the plurality of reduced order models 410 can include one or more of a gradient boosting model, a regression model, a recurrent neural network model, or a long short-term memory model.

Figure 5:
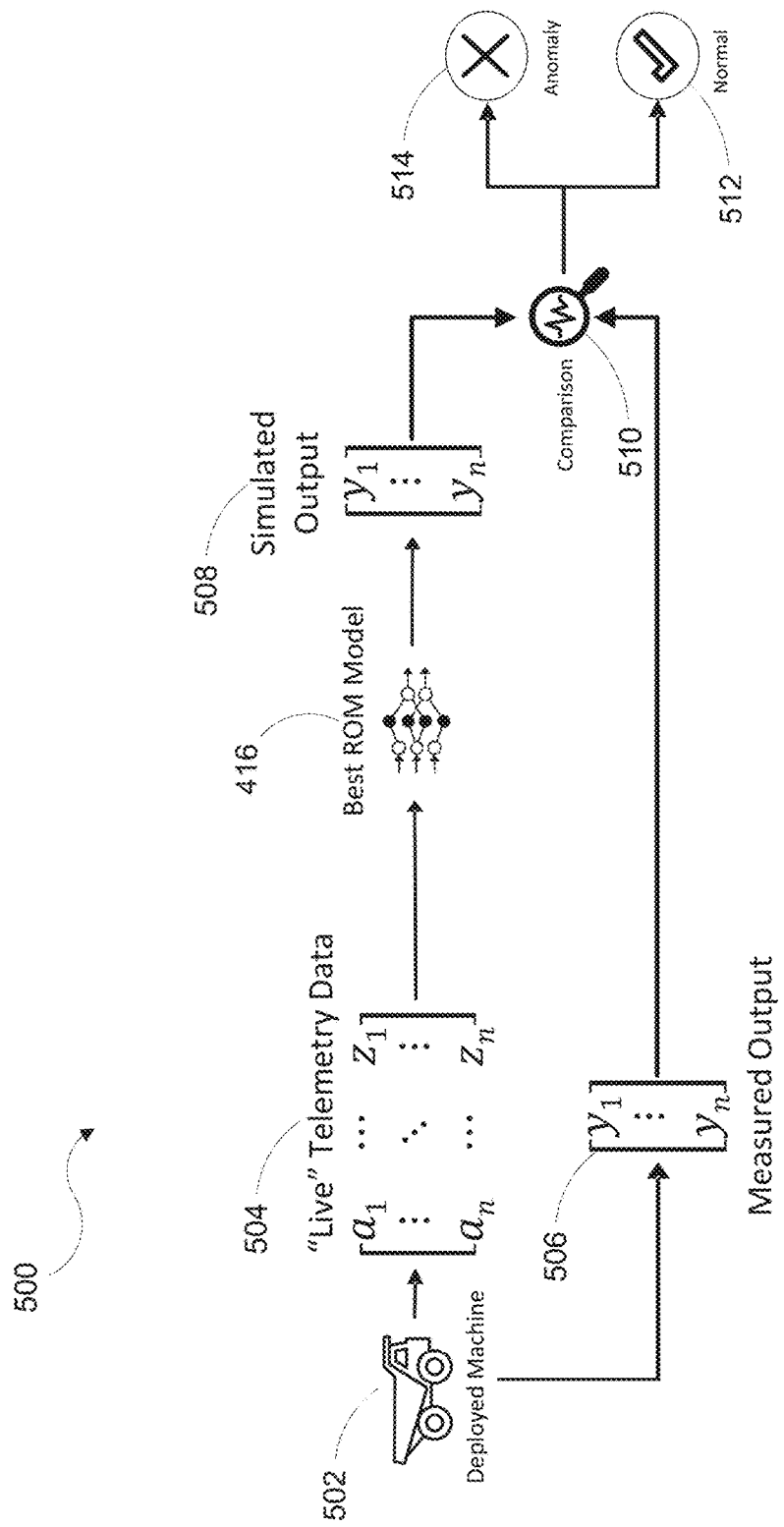
FIG. 5 is a diagram illustrating a reduced order model anomaly detection system according to some embodiments of the disclosed technology.

FIG. 5 illustrates a reduced order model anomaly detection system 500 according to some embodiments of the disclosed technology. The anomaly detection system 500 can detect an operating anomaly in a deployed machine 502 by feeding current data 504 (e.g., live or real-time data) from the deployed machine into the ROM 416 selected by the system 400 as described above. A current simulated output 508 from the selected ROM 416 is compared 510 with measured output 506 (e.g., coolant temperature, oil pressure, or the like) from the current data 504. An operating anomaly 514 is determined to exist when the difference between the current output 508 and the measured output 506 exceeds a selected anomaly threshold. In some embodiments, the threshold is exceeded if the Mean Absolute Percent Error (MAPE) between actual (measured output) and simulated (current output) is greater than 0.10 (10%). If an anomaly is detected the cause of the anomaly can by analyzed as described below with respect to FIG. 6. Otherwise, if the systems are operating normally the anomaly detection system 500 can continue to monitor the current data 504 for any anomalies. In some embodiments, a machine subsystem associated with an operating anomaly can be identified. For example, if there is an anomaly in the engine coolant temperature, the cooling subsystem of the machine can be identified as needing analysis.

Figure 6:
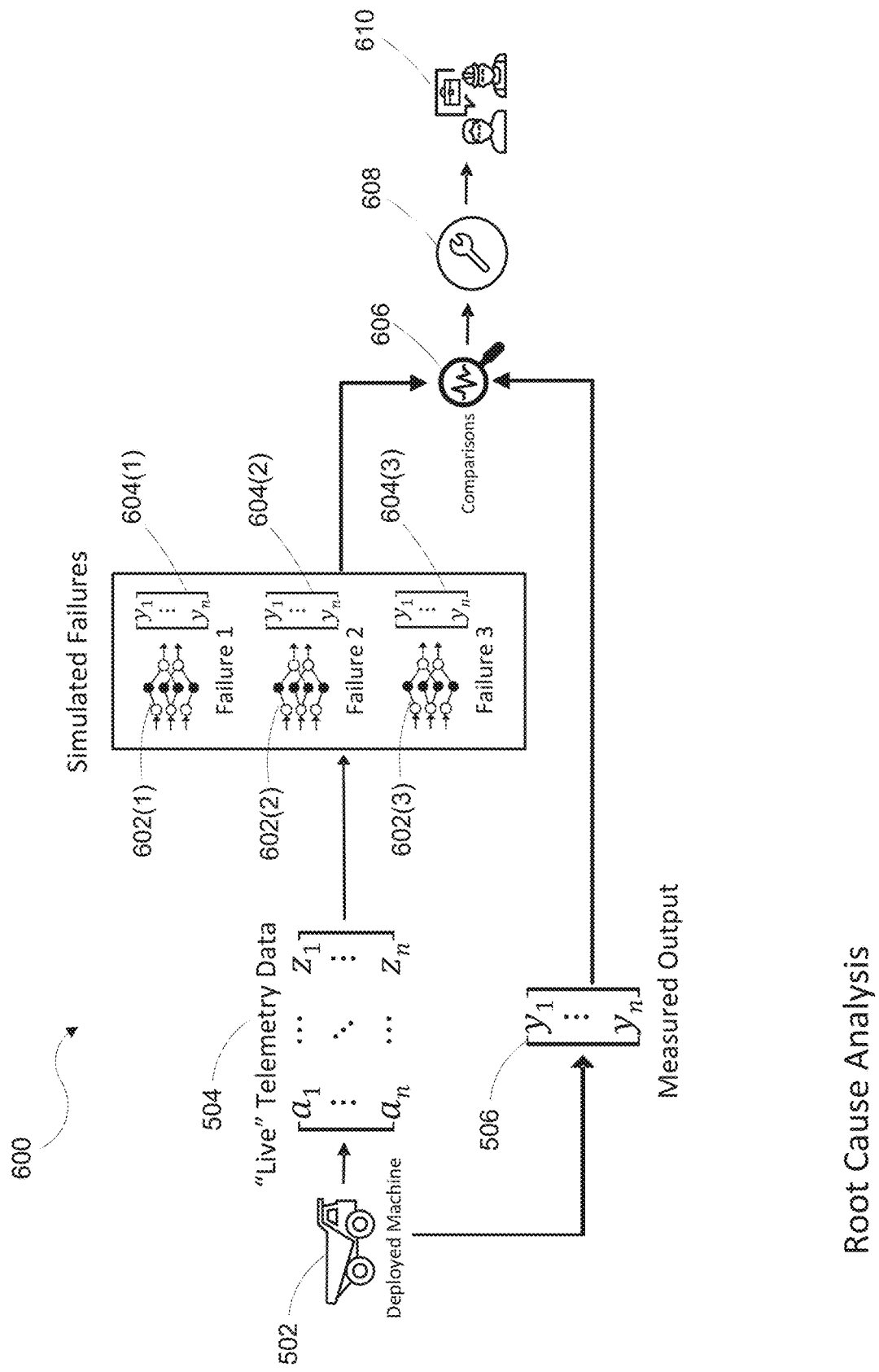
FIG. 6 is a diagram illustrating a system for determining the cause of a machine operating anomaly according to some embodiments of the disclosed technology.

FIG. 6 is a diagram illustrating a system 600 for determining the cause of a machine operating anomaly according to some embodiments of the disclosed technology. As noted above, if the anomaly detection system 500 detects an anomaly, the cause analysis system 600 can help identify the cause of the anomaly. The cause analysis system 600 can identify the cause of the operating anomaly by feeding the current data 504 (e.g., live or real-time data) into a plurality of fault models 602(1), 602(2), 602(3). In some embodiments, the plurality of fault models are based on a subsystem model associated with the machine subsystem identified by the anomaly detection system 500, as explained above with respect to FIG. 5. Each fault model 602 includes a particular component or system failure or degradation. Using an engine cooling system as an example, potential failures can include a stuck thermostat (e.g., open or closed), a leaking radiator (e.g., small or large leak), broken water pump, and the like. The system 600 compares 606 an output 604 from each of the plurality of fault models 602 with the measured output 506 from the current data 504. The fault model 602 with the fault model output 604 most closely matching the measured output 506 is selected and the component failure associated with the selected fault model is identified as the cause 608 of the operating anomaly. The cause of the anomaly can then be communicated (e.g., displayed) to appropriate personnel 610 e.g., the machine operator, service technicians, and/or an equipment dealer.

FIGS. 7A-C are example graphs of actual 702 and simulated 704 machine coolant temperatures illustrating normal operation (FIG. 7A), an operating anomaly (FIG. 7B), and a cause analysis comparison (FIG. 7C) for engine coolant temperature (ECT). In FIG. 7A the simulated or predicted output 704 and the measured output 702 for ECT is very similar and does not exceed the anomaly threshold. Accordingly, the cooling system is operating normally. However, in FIG. 7B there is a large difference between the simulated output 704 and the measured output 702. In this case, the measured output 702 is below the temperature that is expected based on the simulated output 704. The difference exceeds the anomaly threshold and an anomaly is indicated. FIG. 7C illustrates a fault model simulation output 706 for a failed thermostat (e.g., stuck open) which matches well with the measured output 702 thereby indicating the detected anomaly is likely due to a thermostat stuck in the open position.

Figure 8:
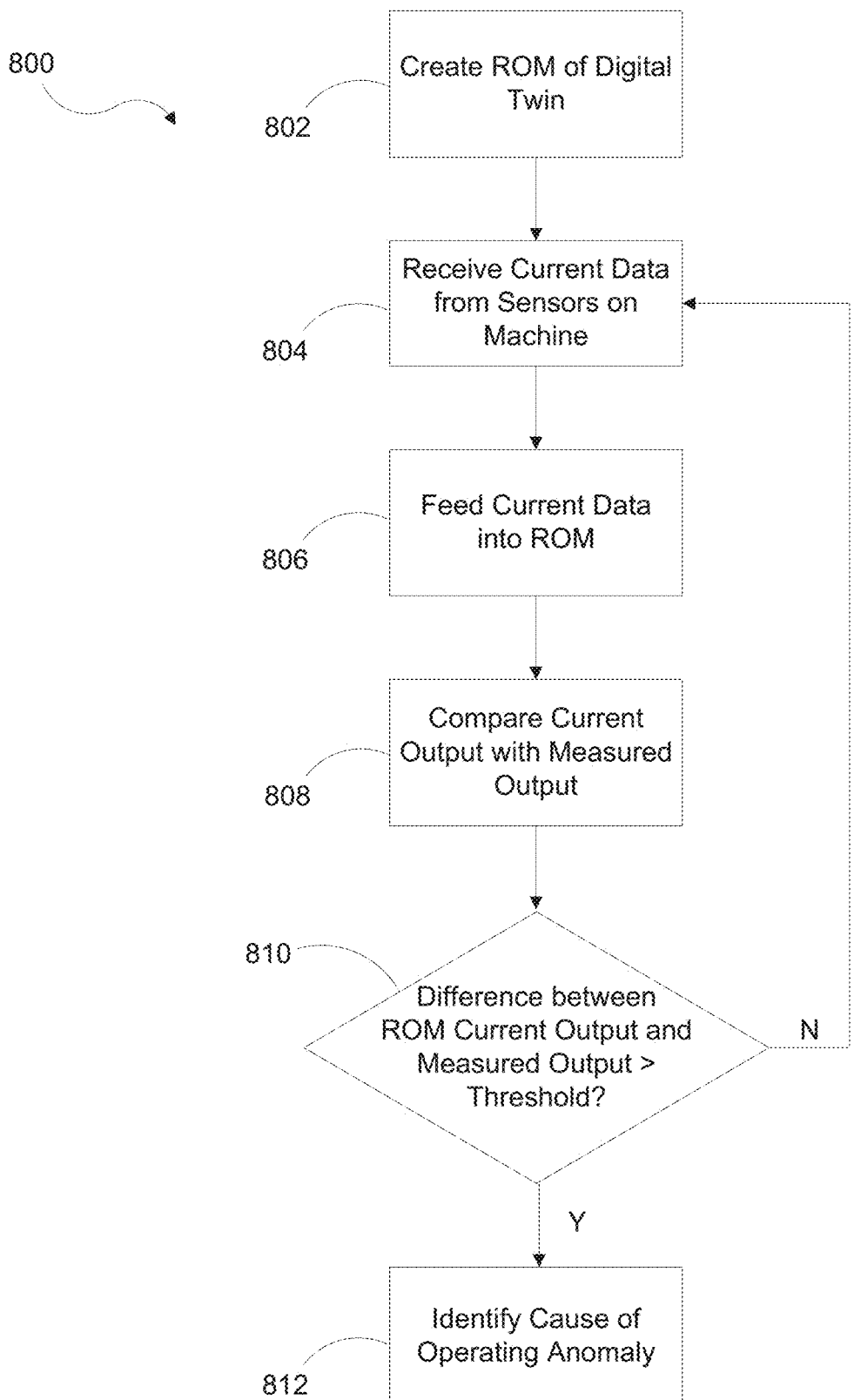
FIG. 8 is a flow diagram showing a method for detecting machine anomalies with a reduced order model according to some embodiments of the disclosed technology.

FIG. 8 is a flow diagram showing a method 800 for detecting machine anomalies with a reduced order model according to some embodiments of the disclosed technology. The method 800 can include creating a reduced order model (ROM) for a digital twin model of a selected machine type at step 802. Current data is received from sensors on the deployed machine at step 804 and the current data is fed into the ROM at step 806. At step 808 a current output from the ROM is compared with a measured output from the current data. At step 810, the method determines that an operating anomaly exists when the difference between the current output and the measured output exceeds a selected anomaly threshold and the cause of the operating anomaly is identified at step 812. If the difference between the current output and the measured output does not exceed the anomaly threshold at step 810, the method loops back to step 804 to continue monitoring the machine.

Figure 9:
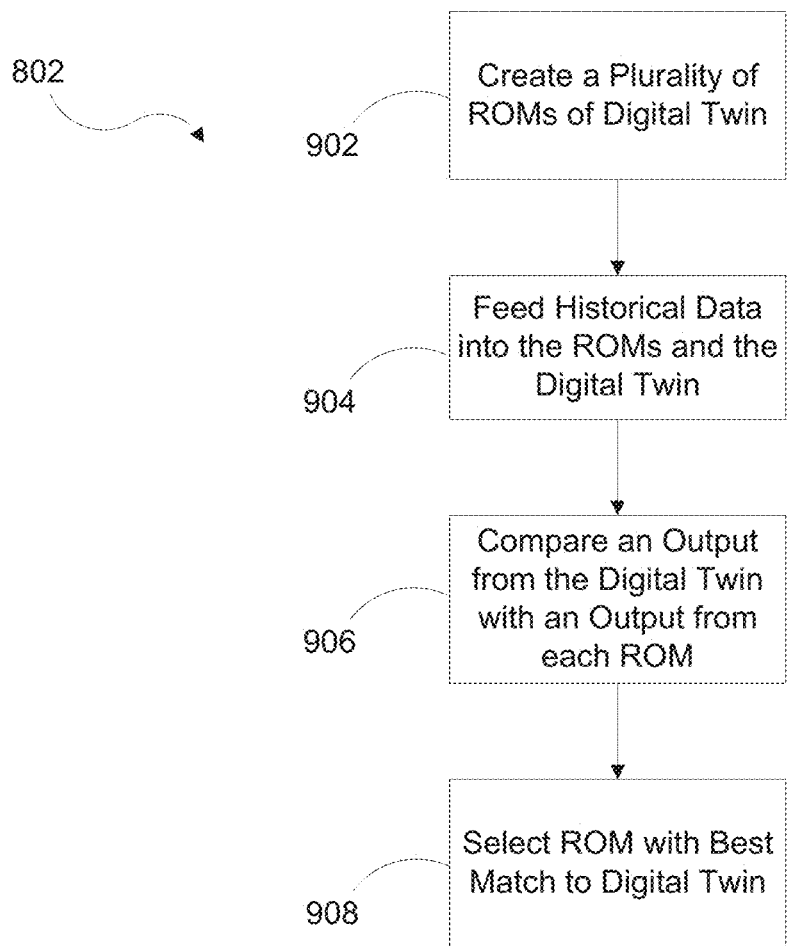
FIG. 9 is a flow diagram showing a method for developing a reduced order model of a digital twin for detecting and analyzing machine anomalies according to some embodiments of the disclosed technology.

FIG. 9 is a flow diagram showing the method 802 for creating a reduced order model of a digital twin for detecting machine anomalies according to some embodiments of the disclosed technology. The method 802 can include creating a plurality of reduced order models for the digital twin model for the selected machine type at step 902 and feeding historical data from a plurality of machines of the selected machine type into the plurality of ROMs and the digital twin model at step 904. The method can compare an output from the digital twin model with an output from each of the ROMs at step 906 and select the ROM with the output most closely matching the output of the digital twin model at step 908.

Figure 10:
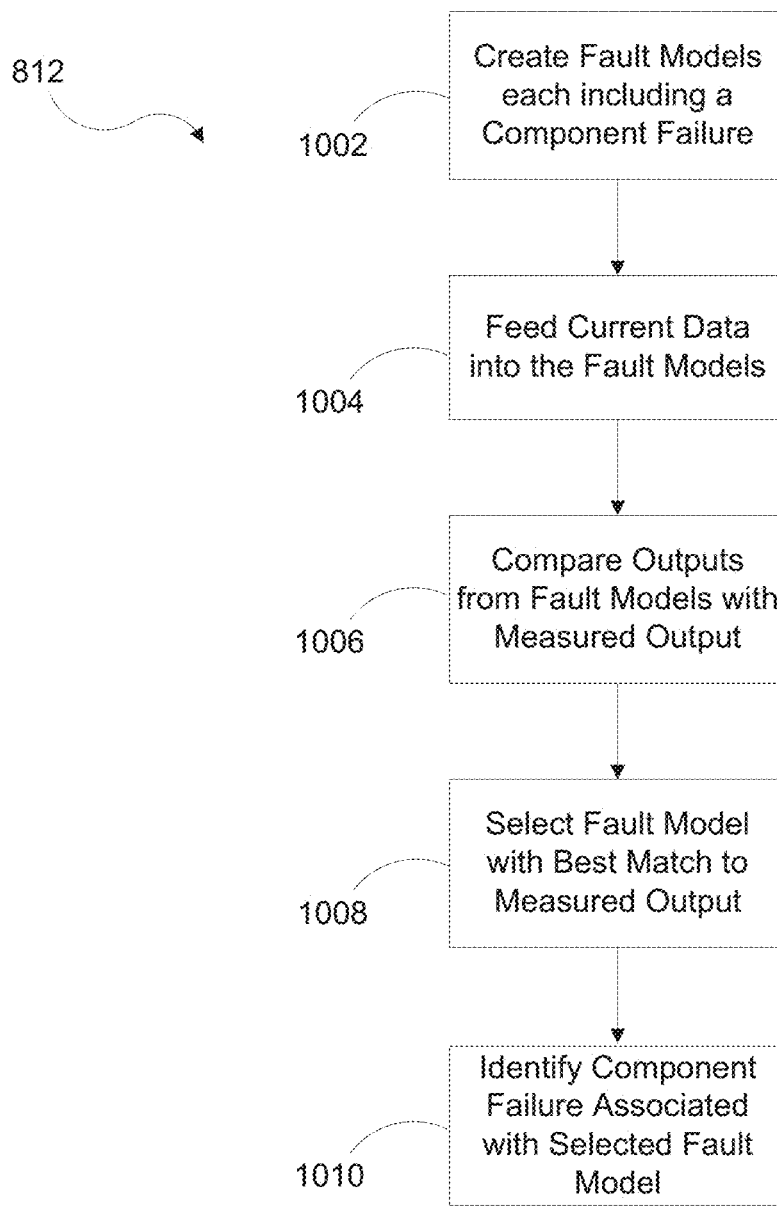
FIG. 10 is a flow diagram showing a method for determining the cause of a machine operating anomaly according to some embodiments of the disclosed technology.

FIG. 10 is a flow diagram showing a method 812 for determining the cause of a machine operating anomaly according to some embodiments of the disclosed technology. The method 812 can include creating a plurality of fault models at step 1002. Each fault model includes a particular component failure. The method 812 can also include feeding the current data into the plurality of fault models at step 1004 and comparing a fault model output from each of the plurality of fault models with the measured output from the current data at step 1006. At step 1008, the method selects the fault model with the fault model output most closely matching the measured output and at step 1010 the component failure associated with the selected fault model is identified as the cause of the operating anomaly. In some embodiments, each fault model is a ROM based on a corresponding digital twin model of the machine, or a subsystem of the machine, including the particular component failure.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 11:
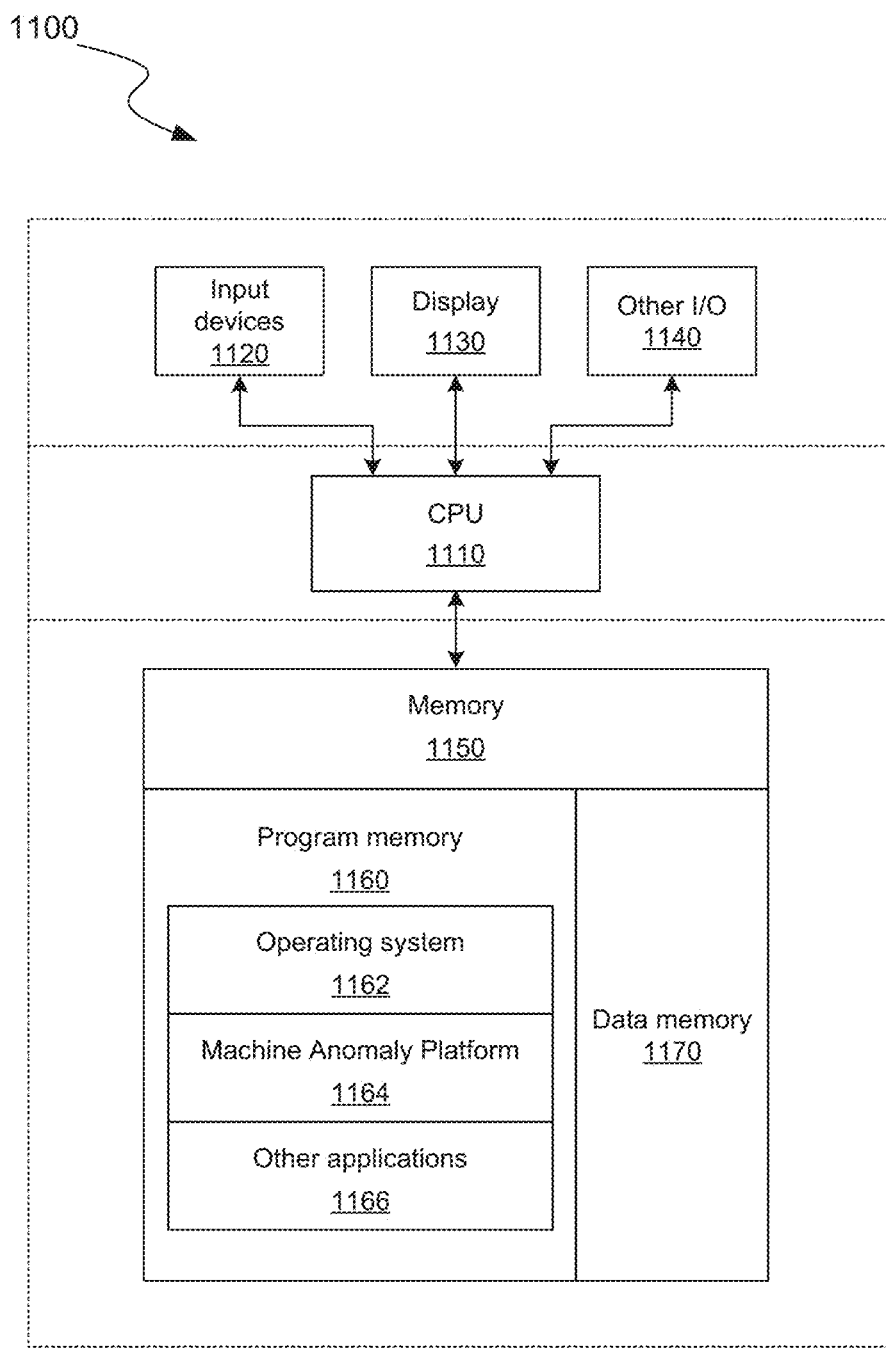
FIG. 11 is a block diagram illustrating an overview of devices on which some implementations can operate.

Several implementations are discussed below in more detail in reference to the figures. FIG. 11 is a block diagram illustrating an overview of devices on which some implementations of the disclosed technology can operate. The devices can comprise hardware components of a device 1100 that performs machine anomaly detection and analysis, for example. Device 1100 can include one or more input devices 1120 that provide input to the CPU (processor) 1110, notifying it of actions. The actions are typically mediated by a hardware controller that interprets the signals received from the input device and communicates the information to the CPU 1110 using a communication protocol. Input devices 1120 include, for example, sensors, a mouse, a keyboard, a touchscreen, an infrared sensor, a touchpad, a wearable input device, a camera- or image-based input device, a microphone, or other user input devices.

CPU 1110 can be a single processing unit or multiple processing units in a device or distributed across multiple devices. CPU 1110 can be coupled to other hardware devices, for example, with the use of a bus, such as a PCI bus or SCSI bus. The CPU 1110 can communicate with a hardware controller for devices, such as for a display 1130. Display 1130 can be used to display text and graphics. In some examples, display 1130 provides graphical and textual visual feedback to a user. In some implementations, display 1130 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1140 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 1100 also includes a communication device capable of communicating wirelessly or wire-based with a network node. The communication device can communicate with another device or a server through a network using, for example, TCP/IP protocols. Device 1100 can utilize the communication device to distribute operations across multiple network devices.

The CPU 1110 can have access to a memory 1150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1150 can include program memory 1160 that stores programs and software, such as an operating system 1162, Machine Anomaly Analysis Platform 1164, and other application programs 1166. Memory 1150 can also include data memory 1170 that can include database information, etc., which can be provided to the program memory 1160 or any element of the device 1100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 12:
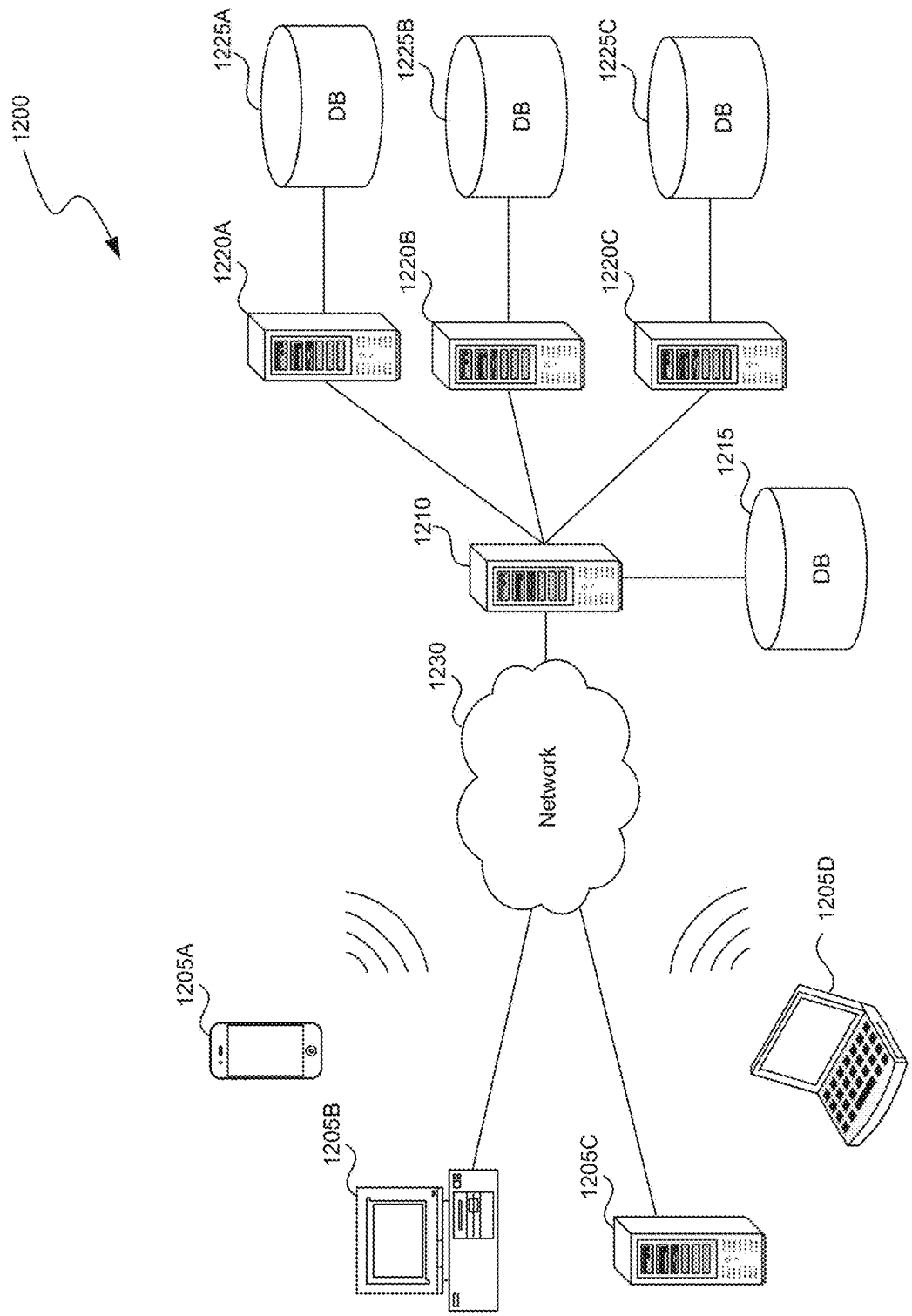
FIG. 12 is a block diagram illustrating an overview of an environment in which some implementations can operate.

FIG. 12 is a block diagram illustrating an overview of an environment 1200 in which some implementations of the disclosed technology can operate. Environment 1200 can include one or more client computing devices 1205A-D, examples of which can include device 1100. Client computing devices 1205 can operate in a networked environment using logical connections through network 1230 to one or more remote computers, such as a server computing device 1210.

In some implementations, server computing device 1210 can be an edge server that receives client requests and coordinates fulfillment of those requests through other servers, such as servers 1220A-C. Server computing devices 1210 and 1220 can comprise computing systems, such as device 1100. Though each server computing device 1210 and 1220 is displayed logically as a single server, server computing devices can each be a distributed computing environment encompassing multiple computing devices located at the same or at geographically disparate physical locations. In some implementations, each server computing device 1220 corresponds to a group of servers.

Client computing devices 1205 and server computing devices 1210 and 1220 can each act as a server or client to other server/client devices. Server 1210 can connect to a database 1215. Servers 1220A-C can each connect to a corresponding database 1225A-C. As discussed above, each server 1220 can correspond to a group of servers, and each of these servers can share a database or can have their own database. Databases 1215 and 1225 can warehouse (e.g., store) information. Though databases 1215 and 1225 are displayed logically as single units, databases 1215 and 1225 can each be a distributed computing environment encompassing multiple computing devices, can be located within their corresponding server, or can be located at the same or at geographically disparate physical locations.

Network 1230 can be a local area network (LAN) or a wide area network (WAN), but can also be other wired or wireless networks. Network 1230 may be the Internet or some other public or private network. Client computing devices 1205 can be connected to network 1230 through a network interface, such as by wired or wireless communication. While the connections between server 1210 and servers 1220 are shown as separate connections, these connections can be any kind of local, wide area, wired, or wireless network, including network 1230 or a separate public or private network.

Figure 13:
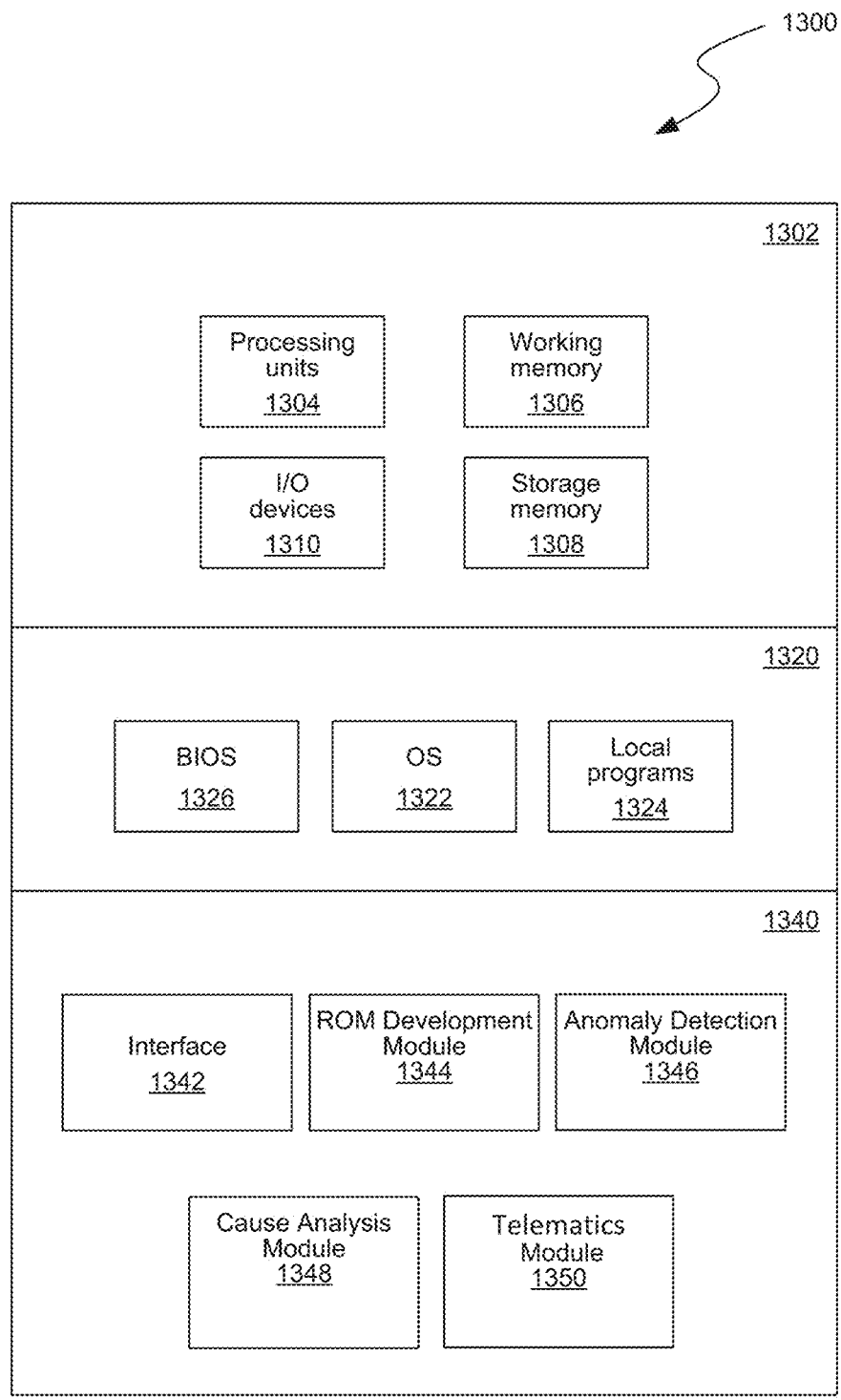
FIG. 13 is a block diagram illustrating components which, in some implementations, can be used in a system employing the disclosed technology.

FIG. 13 is a block diagram illustrating components 1300 which, in some implementations, can be used in a system employing the disclosed technology. The components 1300 include hardware 1302, general software 1320, and specialized components 1340. As discussed above, a system implementing the disclosed technology can use various hardware, including processing units 1304 (e.g., CPUs, GPUs, APUs, etc.), working memory 1306, storage memory 1308, and input and output devices 1310. Components 1300 can be implemented in a client computing device such as client computing devices 1205 or on a server computing device, such as server computing device 1210 or 1220.

General software 1320 can include various applications, including an operating system 1322, local programs 1324, and a basic input output system (BIOS) 1326. Specialized components 1340 can be subcomponents of a general software application 1320, such as local programs 1324. Specialized components 1340 can include a ROM Development Module 1344, an Anomaly Detection Module 1346, a Cause Analysis Module 1348, a Telematics Module 1350, and components that can be used for transferring data and controlling the specialized components, such as Interface 1342. In some implementations, components 1300 can be in a computing system that is distributed across multiple computing devices or can be an interface to a server-based application executing one or more of specialized components 1340.

Those skilled in the art will appreciate that the components illustrated in FIGS. 11-13 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a machine anomaly identification and cause analysis system can include a ROM Development Module 1344, an Anomaly Detection Module 1346, and a Cause Analysis Module 1348 (FIG. 13). In operation, the ROM Development Module 1344 can select a reduced order model (ROM) for a digital twin model of a selected machine type operating on the digital twin model system 104. The module can create a plurality of reduced order models operating on the ROMs system 106 for the digital twin model and feed historical data, stored in the telematics database 102, from a plurality of machines of the selected machine type into the plurality of ROMs and the digital twin model. The module can compare an output from the digital twin model with an output from each of the ROMs and select the ROM with the output most closely matching the output of the digital twin model. The selected ROM can be used in place of the digital twin for anomaly detection and fault analysis.

The Anomaly Detection Module 1346 can receive current data from sensors 22, 24, and 26 on the deployed machine 20(1) and/or from the telematics database 102 and feed the data into the ROM created/selected by ROM Development Module 1344. The module compares a current output from the ROM, received from the ROMs system 106, with a measured output from the current data. The module determines that an operating anomaly exists when the difference between the current output and the measured output exceeds a selected anomaly threshold.

The Cause Analysis Module 1348 can identify the cause of the operating anomaly by feeding the current data received from the sensors 22, 24, and 26 and/or from the telematics database 102 into a plurality of fault models on the fault models system 108. Each fault model can include a particular component failure. The module compares fault model output from each of the plurality of fault models, received from the fault models system 108, with the measured output from the current data. The module selects the fault model with the fault model output most closely matching the measured output and identifies the component failure associated with the selected fault model as the cause of the operating anomaly. The detected anomaly and identified cause can be reported to e.g., the machine operator, service technicians, and/or dealer. Accordingly, the disclosed machine anomaly identification and cause analysis system can help quickly diagnose and resolve problems on a machine thereby reducing downtime and maximizing machine profitability. Furthermore, the disclosed systems and methods can identify and alert personnel to anomalies before more costly problems occur. For example, the system can identify an anomaly in the engine cooling system (e.g., overheating) before damage to the engine occurs.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for identifying a cause of a machine operating anomaly, the method comprising:
   creating a reduced order model (ROM) for a digital twin model of a selected machine type, including:
      creating a plurality of reduced order models (ROMs) for the digital twin model for the selected machine type;
      feeding historical data from a plurality of machines of the selected machine type into the plurality of reduced order models (ROMs) for the digital twin model and the digital twin model;
      comparing an output from the digital twin model with an output from each of the plurality of reduced order models (ROMs) for the digital twin model; and
      selecting, from the plurality of ROMs, a ROM with an output most closely matching the output of the digital twin model;
   feeding current data from a deployed machine into the ROM;
   comparing a current output from the ROM with a measured output from the current data;
   determining that an operating anomaly exists when a difference between the current output and the measured output exceeds a selected anomaly threshold; and
   identifying the cause of the operating anomaly, including:
      feeding the current data into a plurality of fault models, wherein each fault model includes a particular component failure;
      comparing a fault model output from each of the plurality of fault models with the measured output from the current data;
      selecting a fault model with the fault model output most closely matching the measured output; and
      displaying a component failure associated with the selected fault model as the cause of the operating anomaly.

2. The method of claim 1, wherein each fault model is a ROM based on a corresponding digital twin model of the machine including the particular component failure.

3. The method of claim 1, wherein the plurality of reduced order models includes one or more of a gradient boosting model, a regression model, a recurrent neural network model, or a long short-term memory model.

4. The method of claim 1, further comprising receiving the current data from a plurality of sensors on the deployed machine.

5. The method of claim 1, further comprising identifying a machine subsystem associated with the operating anomaly.

6. The method of claim 5, wherein the plurality of fault models are based on a subsystem model associated with the identified machine subsystem.

7. A system for identifying a cause of a machine operating anomaly, comprising:
one or more processors; and
one or more memory devices having stored thereon instructions that when executed by the one or more processors cause the one or more processors to;
create a reduced order model (ROMs) for a digital twin model of a selected machine type, including:
creating a plurality of reduced order models (ROMs) for the digital twin model for the selected machine type;
feeding historical data from a plurality of machines of the selected machine type into the plurality of reduced order models (ROMs) for the digital twin model and the digital twin model;
comparing an output from the digital twin model with an output from each of the plurality of reduced order models (ROMs) for the digital twin model; and
selecting, from the plurality of ROMs, a ROM with an output most closely matching the output of the digital twin model;
receive current data from a plurality of sensors on a deployed machine;
feed the current data into the ROM;
compare a current output from the ROM with a measured output from the current data;
determine that an operating anomaly exists when a difference between the current output and the measured output exceeds a selected anomaly threshold; and
identify the cause of the operating anomaly, including:
feeding the current data into a plurality of fault models, wherein each fault model includes a particular component failure;
comparing a fault model output from each of the plurality of fault models with the measured output from the current data;
selecting a fault model with the fault model output most closely matching the measured output; and
identifying a component failure associated with the selected fault model as the cause of the operating anomaly.

8. The system of claim 7, wherein each fault model is a ROM based on a corresponding digital twin model of the machine including the particular component failure.

9. The system of claim 7, wherein the plurality of reduced order models includes one or more of a gradient boosting model, a regression model, a recurrent neural network model, or a long short-term memory model.

10. The system of claim 7, further comprising instructions to identify a machine subsystem associated with the operating anomaly.

11. The system of claim 10, wherein the plurality of fault models are based on a subsystem model associated with the identified machine subsystem.

12. The system of claim 7, further comprising the plurality of sensors on the machine.

13. The system of claim 12, wherein the current data from the plurality of sensors is received via a satellite network.

14. One or more non-transitory computer-readable media storing computer-executable instructions that, when executed by one or more processors, cause the one or more processors to perform operations comprising:
creating a reduced order model (ROMs) for a digital twin model of a selected machine type, including:
creating a plurality of reduced order models (ROMs) for the digital twin model for the selected machine type;
feeding historical data from a plurality of machines of the selected machine type into the plurality of reduced order models (ROMs) for the digital twin model and the digital twin model;
comparing an output from the digital twin model with an output from each of the plurality of reduced order models (ROMs) for the digital twin model; and
selecting, from the plurality of ROMs, a ROM with an output most closely matching the output of the digital twin model;
feeding current data from a deployed machine into the ROM;
comparing a current output from the ROM with a measured output from the current data;
determining that an operating anomaly exists when a difference between the current output and the measured output exceeds a selected anomaly threshold; and
identifying the cause of the operating anomaly, including:
feeding the current data into a plurality of fault models, wherein each fault model includes a particular component failure;
comparing a fault model output from each of the plurality of fault models with the measured output from the current data;
selecting a fault model with the fault model output most closely matching the measured output; and
identifying a component failure associated with the selected fault model as the cause of the operating anomaly.

15. The one or more non-transitory computer-readable media of claim 14, wherein each fault model is a ROM based on a corresponding digital twin model of the machine including the particular component failure.

16. The one or more non-transitory computer-readable media of claim 14, further comprising instructions to receive the current data from a plurality of sensors on the deployed machine.

17. The one or more non-transitory computer-readable media of claim 14, further comprising instructions to identify a machine subsystem associated with the operating anomaly and wherein the plurality of fault models are based on a subsystem model associated with the identified machine subsystem.

* * * * *